March 7, 1933.  F. B. MINGUS  1,900,838
LAWN MOWING MACHINE
Filed Dec. 31, 1931   3 Sheets-Sheet 1

Inventor
FRED B. MINGUS

March 7, 1933.  F. B. MINGUS  1,900,838
LAWN MOWING MACHINE
Filed Dec. 31, 1931  3 Sheets-Sheet 2
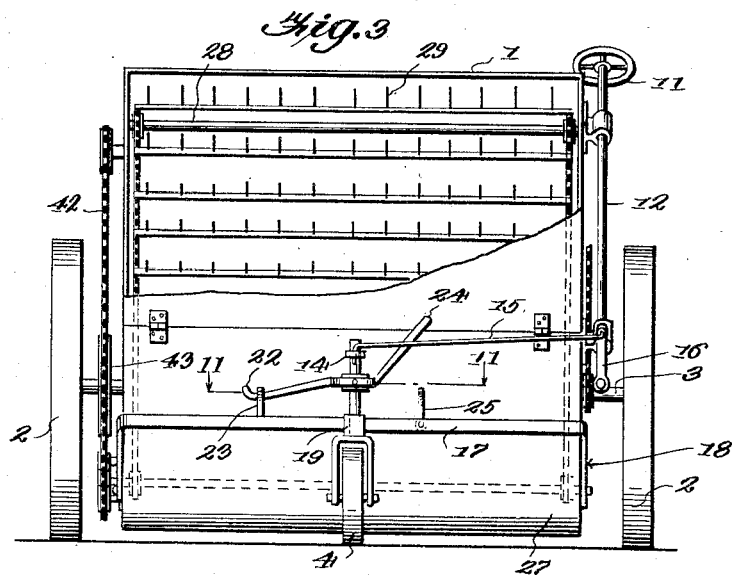
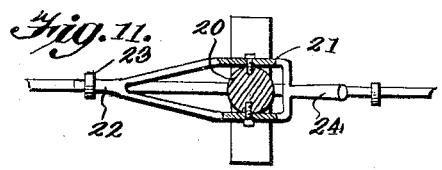
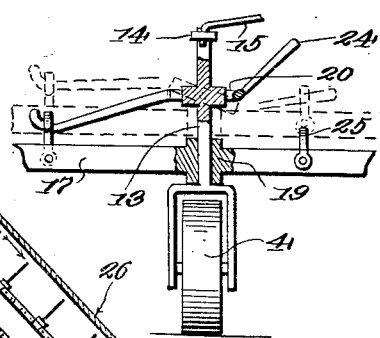
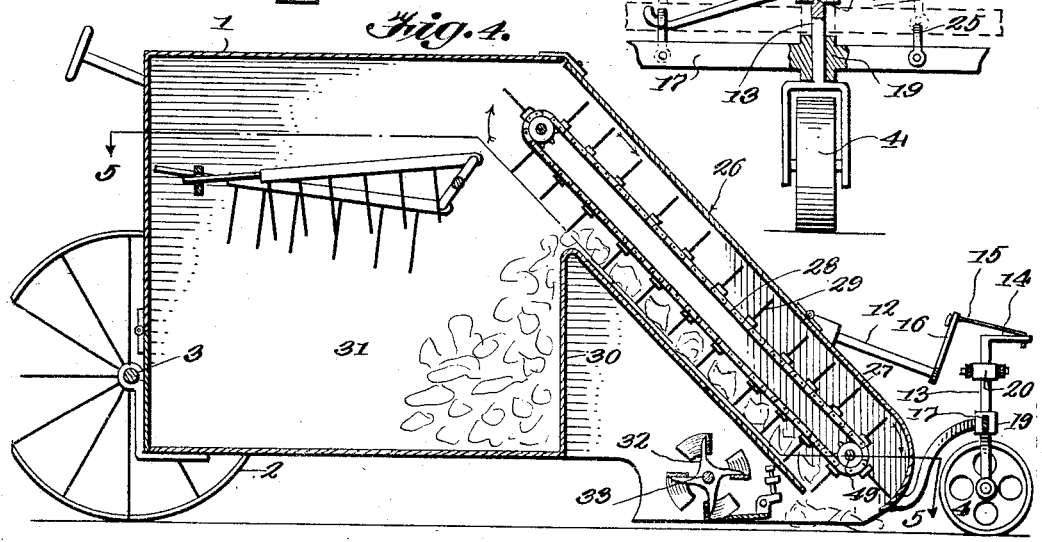
Inventor
FRED B. MINGUS
By Irving R. Cathran
Attorney March 7, 1933.  F. B. MINGUS  1,900,838
LAWN MOWING MACHINE
Filed Dec. 31, 1931  3 Sheets-Sheet 3
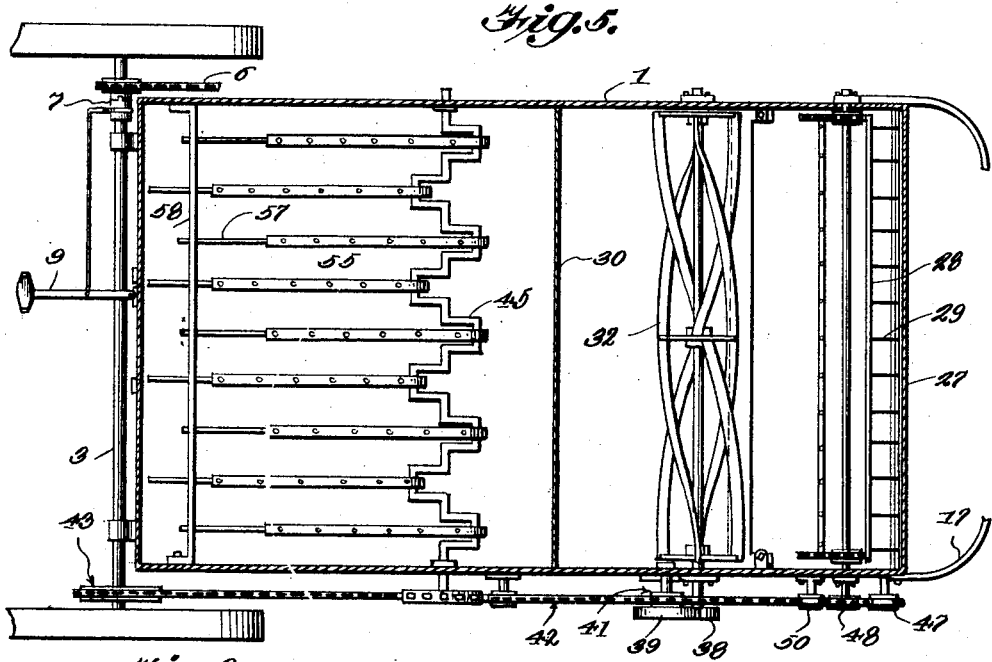
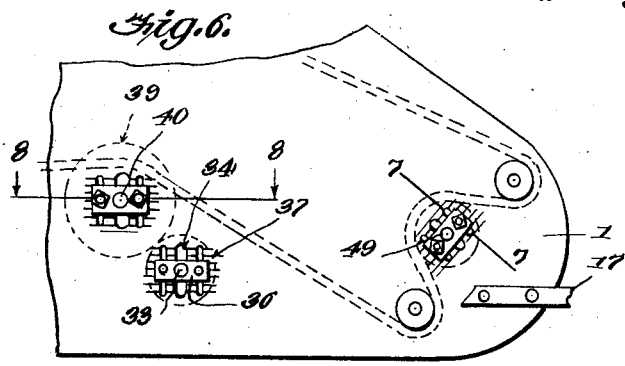
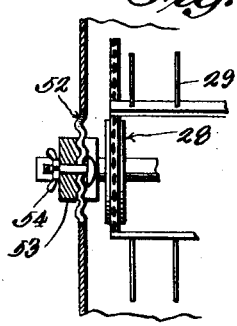
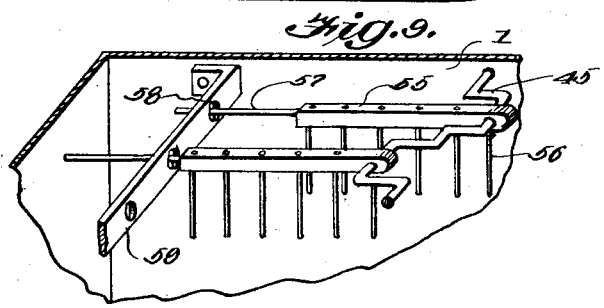
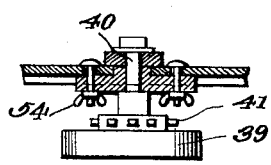
Inventor
FRED B. MINGUS Patented Mar. 7, 1933

1,900,838

UNITED STATES PATENT OFFICE

FRED B. MINGUS, OF OSHKOSH, WISCONSIN

LAWN MOWING MACHINE

Application filed December 31, 1931. Serial No. 584,198.

This invention relates to lawn mowing machines and has for its object the production of a simple and efficient mowing machine which will cut the grass and elevate the cut grass into a container and store the grass until it is desired to dump the cut grass.

A still further object of this invention is the production of a simple and efficient lawn machine which is provided with an efficient elevating means in front thereof, for the purpose of elevating and raising the mower out of contact with the grass.

A still further object of this invention is the production of a simple and efficient means for preventing the grass elevating rig from again carrying the grass to the bottom of the machine after the cut grass has been elevated by the grass elevating rig.

A still further object of this invention is the production of a simple and efficient means for packing and distributing the grass evenly within the grass receiving receptacle.

With these and other objects in view, this invention consists in certain novel construction, combinations and arrangements of parts as will be hereinafter fully described and claimed.

In the drawings:

Figure 3 is a front elevation of the structure shown in Figure 1, certain parts thereof being broken away and shown in section;

Figure 4 is a central longitudinal sectional view of the machine;

Figure 5 is a horizontal sectional view taken on line 5—5 of Figure 4 looking in the direction of the arrow;

Figure 6 is an enlarged side elevation of the forward end of the casing of the machine;

Figure 7 is a section taken on line 7—7 of Figure 6;

Figure 8 is a section taken on line 8—8 of Figure 6;

Figure 9 is a detail perspective view of a portion of the grass catching and distributing mechanism, the supporting housing or casing being shown in section;

Figure 10 is a front elevation partly in section of the elevating means for the forward end of the main frame of the machine; and Figure 11 is a horizontal sectional view taken on line 11—11 of Figure 3, looking in the direction of the arrow.

Figure 1:
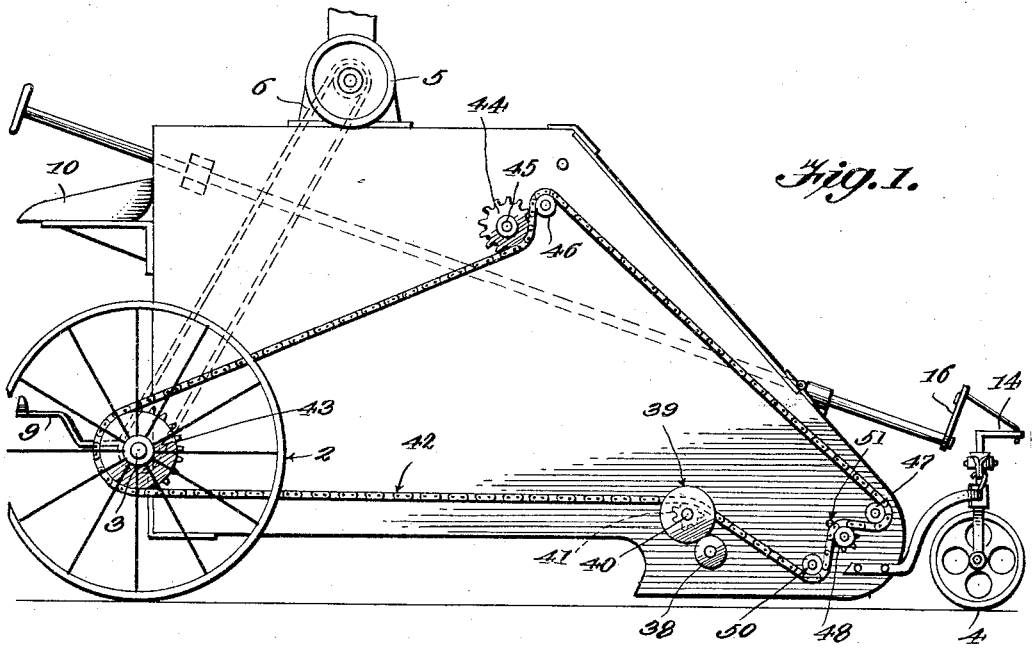
Figure 1 is a side elevation of the improved machine.

By referring to the drawings, it will be seen that 1 designates the main casing of the machine which is supported through the medium of the propelling wheels 2 which are carried by the main drive axle 3. A caster wheel 4 also supports the rear end of the casing 1. The main drive shaft 3 is driven through the medium of a suitable power plant 5, such as a gasoline engine, or the like, which power plant drives a sprocket chain 6, the sprocket chain 6 driving the sprocket wheel 7, and a suitable clutch 8 is employed which is thrown into and out of operative position through the medium of a foot pedal 9. A suitable seat 10 is mounted upon the front end of the casing 1 to accommodate the driver of the machine within reach of the steering wheel 11, which steering wheel 11 is carried by the steering rod 12, hereinafter described.

The rear caster wheel 4 is carried by a vertically extending rotatable shaft 13 which carries a forwardly projecting finger 14, which finger 14 is engaged by means of a suitable steering link 15, the link 15 being in turn connected to a steering finger 16 carried by the steering rod 12. Consequently, by the rotation of the steering wheel 11, the rod will be rotated which will swing the finger 16 and actuate the link 15 for actuating the steering finger 14 carried by the vertically extending rotatable shaft 13 for changing the direction of the caster wheel 4 and facilitating the steering of the entire machine. The caster wheel 4 is so mounted as to normally extend in line with the longitudinal axis of the casing 1, as shown clearly in Figures 1 and 3 and this casing 1 carries a yoke 17 which is substantially U-shaped having its side fingers 18 engaging the sides of the casing 1, the main portion of the yoke 17 projecting beyond the rear end of the casing 1, as shown in Figure 2. A journal 19 is carried centrally of the yoke 17 and constitutes a bearing for the vertically extending shaft of the caster wheel 4. This bearing 19, however, is vertically slidable upon the vertically extending rotatable shaft 13, as shown clearly in Figure 10.

An integral collar 20 is carried by the vertically extending shaft 13 of the caster wheel 4, and a lifting yoke 21 is pivotally mounted upon this collar 20, as shown. The yoke 21 is provided with a projecting lifting hook 22 at its outer end, which extends in a direction transversely of the axis of the casing 1, and fits under an eye or hook 23 carried by the yoke 17. An operating handle 24 is carried by the opposite end of the yoke 21 and as this handle 24 is pressed by an operator, the hook 22 will raise the eye 23 to the position shown in Figure 10, thereby lifting the yoke 17 and elevating the rear end of the casing 1, at which time the handle 24 may be secured under the securing hook 25 of the yoke 17 and in this way hold the yoke 17 in elevated position as shown in dotted lines in Figure 10. The structure just described will be clearly apparent by considering Figures 3, 10, and 11.

When it is desired to move the machine from place to place, and hold the mowing elements in an inoperative position and out of contact with the grass, the operator may merely raise the rear end of the machine by hooking the lifting handle 24 under the hook 25, as described.

The casing or housing 1 comprises a substantially rectangular body having an inclined rear end 26, the lower portion of which is closed by means of a hinged gate 27. Within the inclined rear end of the casing or housing 1 is mounted an endless raker belt or chain 28 having a plurality of spaced raker fingers 29 for the purpose of elevating the cut grass into the upper end of the housing or casing 1. The vertically extending partition 30 is mounted within the casing or housing 1 for providing a storage container 31 in the forward end of the casing 1, as shown in Figure 4. Mounted below and in a position forward of the lower end of the raking conveyor just described, is the cutting element or mower element 32 of suitable construction, and of the well known mower type used upon lawnmowers and the like. This mowing element 32 is supported upon a mowing shaft 33, which mowing shaft 33 is adjustably mounted through the slot 34 formed in the opposite side of the casing 1. Supporting cleats 36 are employed for locking the mower shaft 33 in proper adjusted position by cooperating with the corrugated portions 37 formed in the sides of the casing 1. Suitable clamping means are employed for locking the cleats 36 in an adjusted position.

Figure 2:
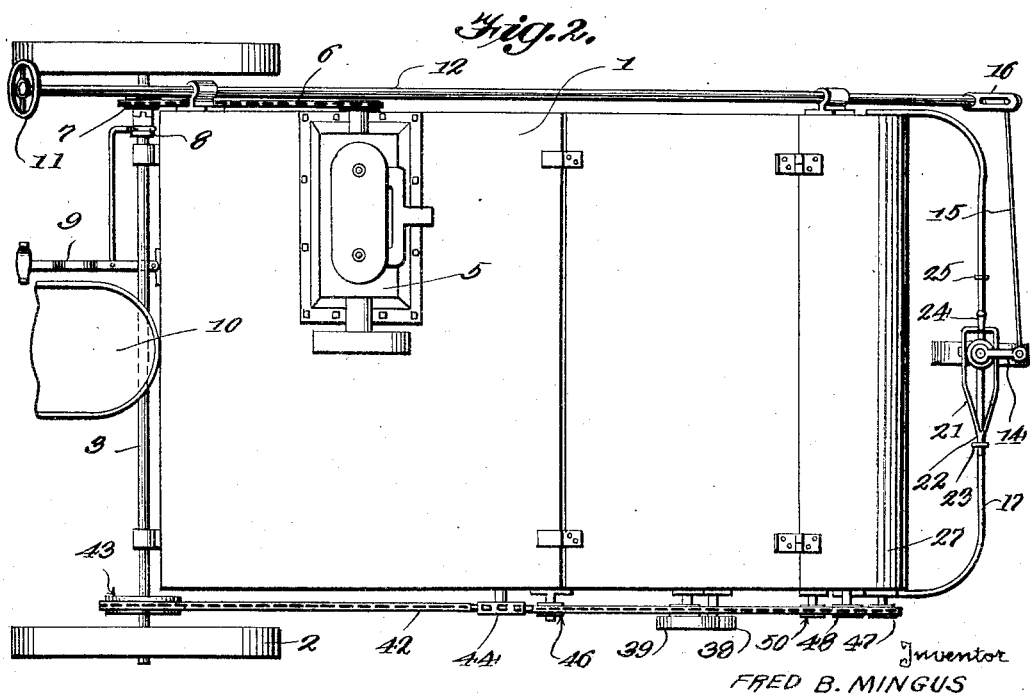
Figure 2 is a top plan view thereof.

One end of the mower shaft 33 carries a friction disc or roller 38 which is adapted to frictionally engage the friction driving pulley 39 carried by the supporting shaft 40, which supporting shaft 40 is driven through the medium of the sprocket wheel 41, the sprocket 41 being driven through the medium of the primary drive sprocket chain 42, as shown clearly in Figure 1. This sprocket chain 42 also passes over the primary driving sprocket 43 carried by the drive shaft 3, and the chain then passes under a sprocket wheel 44 carried by the crank shaft 45, hereinafter described. The sprocket chain then passes over the idle sprocket 46 and extends downwardly over an idle sprocket or roller 47 near the forward end of the casing 1, and near the lower end thereof. The sprocket chain passes under the sprocket wheel 48, which sprocket wheel 48 is carried by the drive shaft 49 of the raking conveyor 28. A further sprocket roller 50 is arranged in spaced relation with respect to the guide or idle roller 47, so as to hold the chain taut across the lower face of the driving sprocket 48. This driving sprocket 48 and the supporting shaft may be adjusted through the medium of the elongated slots 51 formed in the side of the casing 1. The shaft 49 extends through the elongated slots 51 formed upon each side of the casing or housing 1, and the casing or housing 1 adjacent to the slots is corrugated as shown in detail in Figure 7, and indicated by the numeral 52. A clamping cleat 53 is employed registering with the corrugations 52 and being held in engagement therewith through the medium of suitable nuts 54 which may be of any suitable or desired type, and particularly of the wing type, if desired. The securing bolts which carry the clamping nuts 54 may also pass through elongated slots to permit of a proper adjustment of the various parts.

Through the medium of the structure just described, it will be seen that the friction wheel 39 may be adjusted, as well as the friction wheel or roller 38, both wheels being adjusted with respect to each other and the sprocket wheel 48 may also be adjusted in order that a proper driving tension may be maintained upon the sprocket chain, and also for the purpose of insuring a proper operation of the various parts.

As previously described, the sprocket wheel 44 drives the crank shaft 45 which crank shaft supports a plurality of packer members in the nature of raking arms 55, each raking arm carrying a plurality of depending raking fingers 56. The forward ends of these arms are provided with supporting fingers 57 which work through the apertures 58 carried by the guide bar 59 mounted in the forward upper end of the casing 1, as shown. These packer or raking arms are adapted to pull the cut grass away from the elevating conveyor 28 and prevent the grass from piling up against the partition 30 and in close contact with the raking fingers 29 which would be likely to cause the grass to be again raked down on top of the mowing or cutting element 32.

From the foregoing description, it will be seen that a very simple and efficient lawn machine has been provided which is in the nature of a combination cutting-elevating and storing machine, whereby the grass will be mowed by the cutting element, elevated by the conveyor, and conveniently stored and packed by the packing or raking arms just described. Furthermore, the various portions of the device may be properly adjusted to insure proper operation of the various parts and to insure proper frictional driving action of the mower element. Due to the friction drive of the mowing element, it will be understood that considerable resistance will be overcome which would tend to eliminate the breaking of the mowing element should the same come in contact with a hard surface such as a rock, or stone, or large stick. At the same time, sufficient driving power is employed to drive the mower element under ordinary conditions for the purpose of cutting the grass. It should be further understood that the conveyor fingers may be of proper length to elevate the grass, although in actual experience it has been found that these fingers need not come in direct contact with the surface of the ground. When the grass is cut the same will pile so as to be conveniently lifted by the fingers.

It should be understood that certain detail changes may be employed without departing from the spirit of the invention, so long as these changes fall within the scope of the invention and claims.

Having described the invention, what is claimed as new is:

1. A machine of the class described comprising a casing, a supporting and driving means therefor, a mowing element carried by said casing, an elevating conveyor placed adjacent and in the rear of said mowing element, said casing provided with a storage compartment, and packer means having a rearward and downward pulling action mounted within the storage compartment in the rear of said elevating conveyor, said packer means having a raking and packing action for pulling material away from said elevating conveyor and packing the material in said storage compartment.

2. A machine of the class described comprising a casing, means for supporting and conveying said casing, a lower element, means for adjustably supporting said element upon said casing, a conveyor and lifting element mounted adjacent said mower element for conveying and lifting cut grass from the mower element to the upper end of said casing, said casing provided with a storage compartment, and packer and raker means having a rearward and downward pulling action mounted within said storage compartment for pulling cut grass away from and out of contact with the elevating and conveying means.

3. A machine of the class described comprising a casing, means for supporting and conveying said casing, said casing provided with a rear inclined end, a lifting and conveying element mounted within said rear inclined end and coming in close proximity with the bottom of said casing, a mower element mounted in advance of said elevating and conveying means, said casing provided with a vertically extending partition located adjacent said elevating means, a packing and raking means comprising a plurality of reciprocating arms, a crank shaft for driving said arms, a supporting bar, each arm provided with a guiding finger working through said supporting bar, and means for driving said packing and raking means, said elevating and conveying means, and said mower means.

4. A machine of the class described comprising a casing, a driving shaft mounted on said casing, wheels supporting said driving shaft, a mower means carried by said casing, a friction wheel carried by said mower means, a second friction wheel frictionally engaging said first-mentioned friction wheel, and means cooperating with said drive shaft and said last-mentioned friction wheel for imparting rotary motion thereto, and conveyor means driven from said last mentioned means for conveying cut material from said mower means.

5. A machine of the class described comprising a casing, a drive shaft mounted on said casing, wheels for supporting said drive shaft, an elevator and conveyor means carried by said casing, a mower means carried by said casing, a packer means carried by said casing, each of said elevator and mower means being adjustably mounted, and a common drive chain cooperating with said drive shaft and cooperating with said elevating and conveying means for driving said elevating and conveying means, said mower means and said packer means for driving the same from said main drive shaft.

6. A machine of the class described comprising a casing, supporting wheels for the forward end of the casing, a caster wheel supporting the rear end of said casing, mower means carried by the rear end of said casing, a traveling and elevating conveyor means carried by said casing for elevating cut material from said mower, and means carried by said caster wheel and engaging the rear end of said casing for elevating the rear end of said casing to an inoperative position.

In testimony whereof I affix my signature.

FRED B. MINGUS.